United States Patent
Brasuell et al.

(10) Patent No.: US 12,326,284 B2
(45) Date of Patent: *Jun. 10, 2025

(54) SYSTEMS AND METHODS FOR HUMIDITY CONTROL IN AN AIR CONDITIONING SYSTEM

(71) Applicant: Rheem Manufacturing Company, Atlanta, GA (US)

(72) Inventors: Derek Brasuell, Van Buren, AR (US); Mark Creason, Hackett, AR (US); Robert Neihouse, Jenks, OK (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,630

(22) Filed: Oct. 23, 2023

(65) Prior Publication Data
US 2024/0053077 A1    Feb. 15, 2024

Related U.S. Application Data

(63) Continuation of application No. 18/147,613, filed on Dec. 28, 2022, now Pat. No. 11,828,511, which is a continuation of application No. 16/925,890, filed on Jul. 10, 2020, now Pat. No. 11,566,828.

(51) Int. Cl.
*F25B 49/02* (2006.01)

(52) U.S. Cl.
CPC .... *F25B 49/022* (2013.01); *F25B 2600/0253* (2013.01); *F25B 2700/02* (2013.01); *F25B 2700/1933* (2013.01); *F25B 2700/21151* (2013.01)

(58) Field of Classification Search
CPC ............ F25B 49/022; F25B 2600/0253; F25B 2700/02; F25B 2700/1933; F25B 2700/21151
See application file for complete search history.

(56) References Cited

U.S. PATENT DOCUMENTS

| | | | |
|---|---|---|---|
| 5,142,879 A | 9/1992 | Nakamura et al. | |
| 5,735,134 A * | 4/1998 | Liu | F25B 49/02 62/183 |
| 9,638,447 B2 * | 5/2017 | Yamashita | F25B 49/02 |
| 2007/0227167 A1 | 10/2007 | Shapiro | |

(Continued)

*Primary Examiner* — Jonathan Bradford
(74) *Attorney, Agent, or Firm* — Eversheds Sutherland (US) LLP

(57) ABSTRACT

Disclosed herein are air conditioning systems including a refrigerant line configured to transport a refrigerant; a compressor in fluid communication with the suction line; and a controller in communication with a sensor configured to measure a characteristic of the refrigerant line. The compressor can be configured to move the refrigerant through the refrigerant line, and the refrigerant can have a first temperature at the outlet of the compressor. The controller can be configured to receive sensor data from the sensor indicating a current value associated with the characteristic of the refrigerant line; determine, based at least partially on the sensor data, that the characteristic of the refrigerant line is above a predetermined threshold; and output instructions for the compressor to perform one or more corrective actions.

18 Claims, 4 Drawing Sheets

(56) References Cited

U.S. PATENT DOCUMENTS

| | | |
|---|---|---|
| 2009/0077991 A1 | 3/2009 | Nakajima |
| 2011/0173999 A1 | 7/2011 | Lord et al. |
| 2016/0245536 A1 | 8/2016 | Iwasaki |
| 2017/0023264 A1* | 1/2017 | Ha ................... F24F 11/46 |
| 2017/0030621 A1 | 2/2017 | Hung |
| 2017/0234559 A1 | 8/2017 | Federspiel et al. |
| 2019/0041099 A1 | 2/2019 | Kono et al. |
| 2019/0323722 A1 | 10/2019 | Goel et al. |

* cited by examiner

SYSTEMS AND METHODS FOR HUMIDITY CONTROL IN AN AIR CONDITIONING SYSTEM

CROSS-REFERENCE TO RELATED PATENT APPLICATION(S)

This application is a continuation of U.S. application Ser. No. 18/147,613, filed Dec. 28, 2022, which is a continuation of U.S. application Ser. No. 16/925,890, filed Jul. 10, 2020, and issued as U.S. Pat. No. 11,566,828, each of which is hereby incorporated by reference in their entireties.

FIELD OF THE DISCLOSURE

The present disclosure relates generally to air conditioning systems and methods and, in particular, to air conditioning controller systems and methods.

BACKGROUND

With the prevalence of heating, ventilation, and air conditioning systems (HVAC), there is an increased demand not only for improved cooling methods, but improved cooling methods utilizing energy- and cost-effective methods.

In warmer climates, efficiency of HVAC systems can be negatively impacted by excess moisture in contact with the system. Additional energy must be expended to remove the water vapor from the air via condensation, and because water has a high latent heat, the efficiency of the air-conditioning system in humid environments is decreased. For instance, in a cooling operation where indoor air humidity is high, excess moisture is traditionally removed by reducing the indoor blower speed or capacity (CFM) to allow the evaporator temperature to decrease sufficiently, thus permitting moisture from the air to condense on the surface of the colder heat exchanger. If this is not done properly, the humidity in the conditioned space can become higher than desired, which can cause discomfort for the user. Additionally, split HVAC systems can separate the outdoor units from the indoor units, and it can be desirable for the outdoor unit to have the ability to remove moisture from the system on its own without relying on the indoor unit, particularly if, for example, the indoor unit lacks the ability to control the excess moisture in the indoor air. If the outdoor unit cannot communicate or receive data from the indoor space, then the overall system can become less efficient at least because of the inability to effectively remove moisture.

What is needed, therefore, are methods and systems to further increase the overall efficiency of HVAC systems and improve the methods of communication in split HVAC systems. The present disclosure addresses this need as well as other needs that will become apparent upon reading the description below in conjunction with the drawings.

BRIEF SUMMARY

The present disclosure relates generally to air conditioning systems and methods and, in particular, to air conditioning controller systems and methods. The disclosed technology can include an outdoor air conditioning system, comprising: a refrigerant line configured to transport a refrigerant; compressor in fluid communication with the suction line; and a controller in communication with a sensor configured to measure a characteristic of the refrigerant line. The compressor can be configured to move the refrigerant through the refrigerant line, the refrigerant having a first temperature at the outlet of the compressor. The instruction to increase the capacity of the compressor can also include instructions to increase a speed at which the compressor operates.

The controller can be configured to: receive sensor data from the sensor, the sensor data being indicative of a current value associated with the characteristic of the refrigerant line; determine, based at least partially on the sensor data, that the characteristic of the refrigerant line is above a predetermined threshold; and output instructions for the compressor to increase a capacity of the compressor such that the refrigerant has a second temperature at the outlet of the compressor, the second temperature being less than the first temperature.

The characteristic of the refrigerant line can include one or more of: (i) a suction temperature of the refrigerant or (ii) a suction pressure of the refrigerant. The characteristic of the refrigerant line can also correspond to a humidity of air thermally interacting with the refrigerant.

The refrigerant can also have a first coil temperature at an evaporator in fluid communication with the refrigerant line and in thermal communication with an indoor space. The second outlet temperature can cause the refrigerant to have a corresponding second coil temperature that is less than the first coil temperature, thereby condensing, by the evaporator, water present in the air of the indoor space.

Also disclosed herein are air conditioning systems comprising: a fluid line configured to transport a refrigerant; a compressor in fluid communication with the fluid line; an evaporator in fluid communication with the fluid line; and a controller in communication with a sensor configured to measure a characteristic of the quantity of indoor air. The compressor can be configured to move the refrigerant through the fluid line, the compressor having a first outlet temperature at which the refrigerant exits the compressor. The evaporator can be configured to conduct a heat exchange between the refrigerant and a quantity of indoor air, the evaporator having a first coil temperature at which the refrigerant exchanges heat with the quantity of indoor air.

Furthermore, the controller can be configured to: determine that the characteristic of the quantity of indoor air is above a predetermined threshold; and instruct the compressor to increase a capacity of the compressor such that the refrigerant exits the compressor at a second outlet temperature, the second outlet temperature being less than the first outlet temperature. The second outlet temperature can cause the evaporator to have a second coil temperature that is less than the first coil temperature, and the second coil temperature can cause an increase in latent heat during the heat exchange.

The sensor can be further configured to measure a characteristic of the fluid line. The characteristic of the fluid line can include one or more of: (i) a suction temperature of the refrigerant, or (ii) a suction pressure of the refrigerant. The characteristic of the fluid line can also be associated with a humidity of air thermally interacting with the refrigerant, or the characteristic of the quantity of indoor air can be associated with a humidity of air interacting with the heat exchange.

The instruction to increase the capacity of the compressor can include instructions to increase a speed at which the compressor operates. Alternatively, or additionally, the instruction to increase the capacity of the compressor can include instructions to increase a sensible heat and/or a latent heat of the refrigerant.

Also disclosed herein are methods of controlling and using the same.

Also disclosed herein are methods of reusing stored cooling energy to improve the overall efficiency of high-load cycles in an air-cooling system.

These and other aspects of the present disclosure are described in the Detailed Description below and the accompanying figures. Other aspects and features of examples of the present disclosure will become apparent to those of ordinary skill in the art upon reviewing the following description of specific examples of the present disclosure in concert with the figures. While features of the present disclosure may be discussed relative to certain examples and figures, all examples of the present disclosure can include one or more of the features discussed herein. Further, while one or more examples may be discussed as having certain advantageous features, one or more of such features may also be used with the various examples of the disclosure discussed herein. In similar fashion, while examples may be discussed below as device, system, or method examples, it is to be understood that such examples can be implemented in various devices, systems, and methods of the present disclosure.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
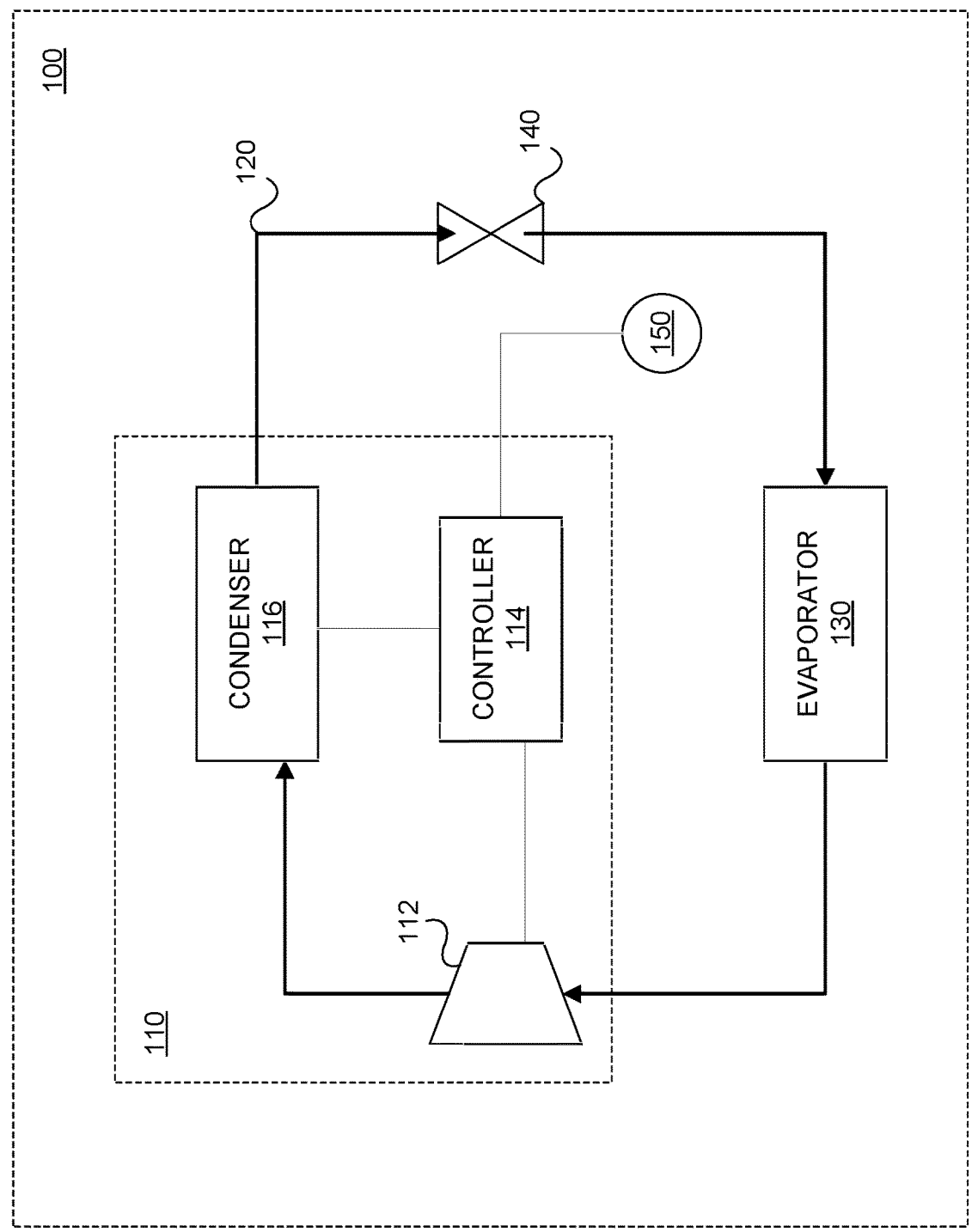
FIG. 1 illustrates a system diagram of an air conditioning system in accordance with the present disclosure.

Traditionally, split variable-speed AC systems are "matched" systems. In other words, the outdoor condenser or heat-pump can be designed to work with a very specific indoor air mover (e.g., furnace, air-handler) and heat-exchanger (e.g., evaporator, coil). Additionally, the outdoor systems can be (but not always are) matched with a specified communicating thermostat. This can, in some cases, help ensure the systems communicate properly and modulate the outdoor compressor speed, outdoor fan speed, indoor fan speed, and even the electronic expansion valve(s) (metering device) (indoor and/or outdoor) as needed to achieve increased efficiency and comfort for the homeowner. The modulation of these key parameters in cooling can aid in the evaporator (heat-exchanger) removing moisture (latent heat) from the indoor air by ensuring the indoor air has the ability to condense the moisture and remove it via condensate disposal plumbing.

Variable-speed outdoor systems can also be matched with a single-speed or two-speed non-communicating indoor air mover combined with a mechanical thermal expansion valve (TXV). Multiple manufacturers offer these types of condensing and/or heat-pump systems as a universal replacement unit. However, these units are not always able to rival the performance of a fully variable, speed-matched system that has the ability to control all needed parameters to ensure user comfort. Without a communicative thermostat and full control and modulation of all necessary components (e.g. the indoor air-moving unit), the system cannot control the indoor airflow and refrigerant metering as needed when the compressor (or other components of the outdoor system) modulates. This reduces the efficiency of removing moisture from the space.

However, the moisture removal capability of the system can be improved if the indoor fan motor is variable and can be linked to and/controlled in tandem with the outdoor compressor and/or other outdoor components. This can be achieved using a suction pressure and/or temperature that can be controlled via an algorithm that resides in the outdoor unit's controller for modulation. Separate control of the indoor fan motor and expansion device is not required and, thus, the control algorithm can function regardless of the indoor air-moving device's capability. Such a control mechanism is ideal for the replacement market of outdoor condensers and heat-pumps where the homeowner does not also want to simultaneously upgrade and/or replace the indoor (air-moving) equipment.

Disclosed herein, therefore, are systems and methods for controlling the outdoor unit of an HVAC system to provide indoor humidity reduction. The systems and methods can include controlling the outdoor unit without any feedback, instruction, or communication from a thermostat, an indoor metering device, and/or an indoor air moving blower system. For example, as explained more fully herein, the disclosed controllers, systems, and methods can be configured to use the suction pressure and/or temperature (or other sensor inputs) at the outdoor unit as a feedback input to a control loop on the outdoor unit to change the sensible-to-latent heat ratio. Such control functions can be performed without any feedback from, or control of, the indoor air moving blower or indoor metering device. Changing the compressor speed and/or outdoor fan speed can change the system performance as desired to achieve a high-humidity target suction pressure, temperature, or other input (or targets for multiple inputs simultaneously) such that, the system can increase cooling capacity while the indoor blower motor and/or metering device remain unchanged. The net effect of this can make the indoor evaporator coil significantly cooler such that more water will condense on that coil and be carried away by the condensate drain disposal plumbing.

The disclosed technology has the ability to control the dehumidification cycle without control of, or feedback from, the indoor air-handler or furnace, indoor blower motor or indoor refrigerant metering device. Essentially, the outdoor unit can function alone to control humidity without need for communication with, or control of, the indoor air moving equipment or indoor metering device. This makes such an outdoor unit desirable for replacement markets such that the indoor unit (furnace, air handler or indoor coil) does not need to be replaced nor do these indoor components need to have dehumidification capabilities in order to achieve dehumidification in the cooling cycle.

Additionally, the disclosed technology can provide a mechanism for transmitting the desired humidity level to the outdoor unit's controller via Bluetooth, Wi-Fi or any other mechanism to indicate the desired humidity level in the home. The input need not be limited by electrical transmission but could also be achieved using an interface directly at the controller or via dipswitches, other inputs directly on the controller, or any other method. This desired humidity level can then be translated by the outdoor unit's controller to determine the proper target suction pressure and/or temperature (and/or other parameters) without any need to communicate with, or change the speed of, the indoor air mover and/or indoor metering device.

Although certain examples of the disclosure are explained in detail, it is to be understood that other examples and applications are contemplated. Accordingly, it is not intended that the disclosure is limited in its scope to the details of construction and arrangement of components set forth in the following description or illustrated in the drawings. Other examples of the disclosure are capable of being practiced or carried out in various ways. Also, in describing the disclosed technology, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to examples of the disclosed technology, some of which are illustrated in the accompanying drawings. Wherever convenient, the same references numbers will be used throughout the drawings to refer to the same or like parts.

FIG. 1 illustrates an air conditioning system 100 comprising an outdoor air conditioning system 110, including a compressor 112 and a controller 114; a fluid line 120 configured to transport a refrigerant; and an evaporator 130. The air conditioning system 100 can also comprise additional components to interact with the refrigerant, such as a thermal expansion valve 140, one or more sensors 150, additional valves and piping, heat exchangers, and the like. An example of the outdoor air conditioning system 110 is shown in greater detail in FIG. 2.

The fluid line 120 can be in fluid and thermal communication with the components of the air conditioning system 100. The fluid line 120 can also transport the refrigerant throughout the air conditioning system 100 and to the various components contained therein. For example, the fluid line 120 can provide a refrigerant flow through the evaporator 130, where the refrigerator can undergo a heat exchange with air in an indoor space. The air conditioning system 100 can include various other components along the fluid line 120, such as valves, pumps, metering devices, and the like. Alternatively, or additionally, the thermal expansion valve (TXV) 140 can be included as a refrigerant metering device on the fluid line 120. Alternatively, or additionally, the compressor 112 can create a pressure gradient to assist in transporting the refrigerant through the fluid line 120.

The evaporator 130 can include a coil where the liquid refrigerant in the refrigerant line 120 can thermally communicate with a volume of air desired to be conditioned (such as inside a user's house). In such an example, the evaporator 130 can have a coil temperature at which the refrigerant exchanges heat with the indoor air. The coil temperature can influence the heat exchanged between the refrigerant flowing through the coil and the indoor air. As will be appreciated, the greater the temperature difference between the coil temperature and the indoor air, the greater the driving force of the heat exchange (e.g., an increased rate of heat exchange) will be. Additionally, a greater driving force can be desirable if the indoor air requires a larger amount of latent heat in addition to sensible heat. In other words, if the indoor air has a large moisture content, then a greater heat exchange will be needed to provide sufficient cooling to the indoor space.

The refrigerant can be selected from a variety of materials. The refrigerant can be any material capable of supplying favorable thermodynamic properties to a cooling system. The refrigerant, for example, can be selected based on a desired boiling point, a high heat of vaporization, a moderate liquid density, a high critical temperature, and/or other aspects. Accordingly, the refrigerant can be any chlorofluorocarbon, chlorofluoroolefin, hydrochlorofluorocarbon, hydrochlorofluoroolefin, hydrofluorocarbon, hydrofluoroolefin, hydrochlorocarbon, hydrochloroolefin, hydrocarbon, hydroolefin, perfluorocarbon, perfluoroolefin, perchlorocarbon, perchloroolefin, halon, or haloalkane. For example, the refrigerant can be any refrigerant designated as such by, and compliant with, the standards, rules, and regulations set forth by the American Society of Heating, Refrigerating, and Air-Conditioning Engineers (ASHRAE) (e.g., ASHRAE Standard 34-2019). For example, the refrigerant can be R-410A or R-134a. It is to be understood, however, that other materials can be used as a refrigerant to transfer heat away from the cooling system 100.

When in use, the refrigerant can flow through the air conditioning system 100 at a suction temperature. The suction temperature of a refrigerant can refer to the temperature at which the refrigerant cycles when under the suction pressure of the suction line in the air conditioning system 100. For example, at a suction pressure in the suction line of 100 psig, R-502 can have a suction temperature of 51° F. Because most real-world cooling systems are not perfectly insulated, the suction temperature and pressure may not be constant throughout the suction line or cooling system. Therefore, the median refrigerant temperature of the refrigerant can be used to approximate the overall suction temperature of the refrigerant.

Additionally, the suction pressure (pressure of the refrigerant returning to the compressor in the refrigeration cycle)

and temperature to the compressor 112 are key metrics that can be used for controlling the refrigeration cycle, in accordance with the disclosed methods and technology. The suction pressure and temperature can be monitored using the one or more sensors 150, including, but not limited to, pressure transducers, thermocouples, and other sensing devices that are known to, and used by those of ordinary skill in the art for such control. For instance, using a microprocessor-based control, various changes can be applied to the compressor speed, outdoor fan speed, indoor fan speed and/or refrigerant metering device(s) (either indoor and/or outdoor) to control the suction pressure and/or temperature and/or other parameters.

Figure 2:
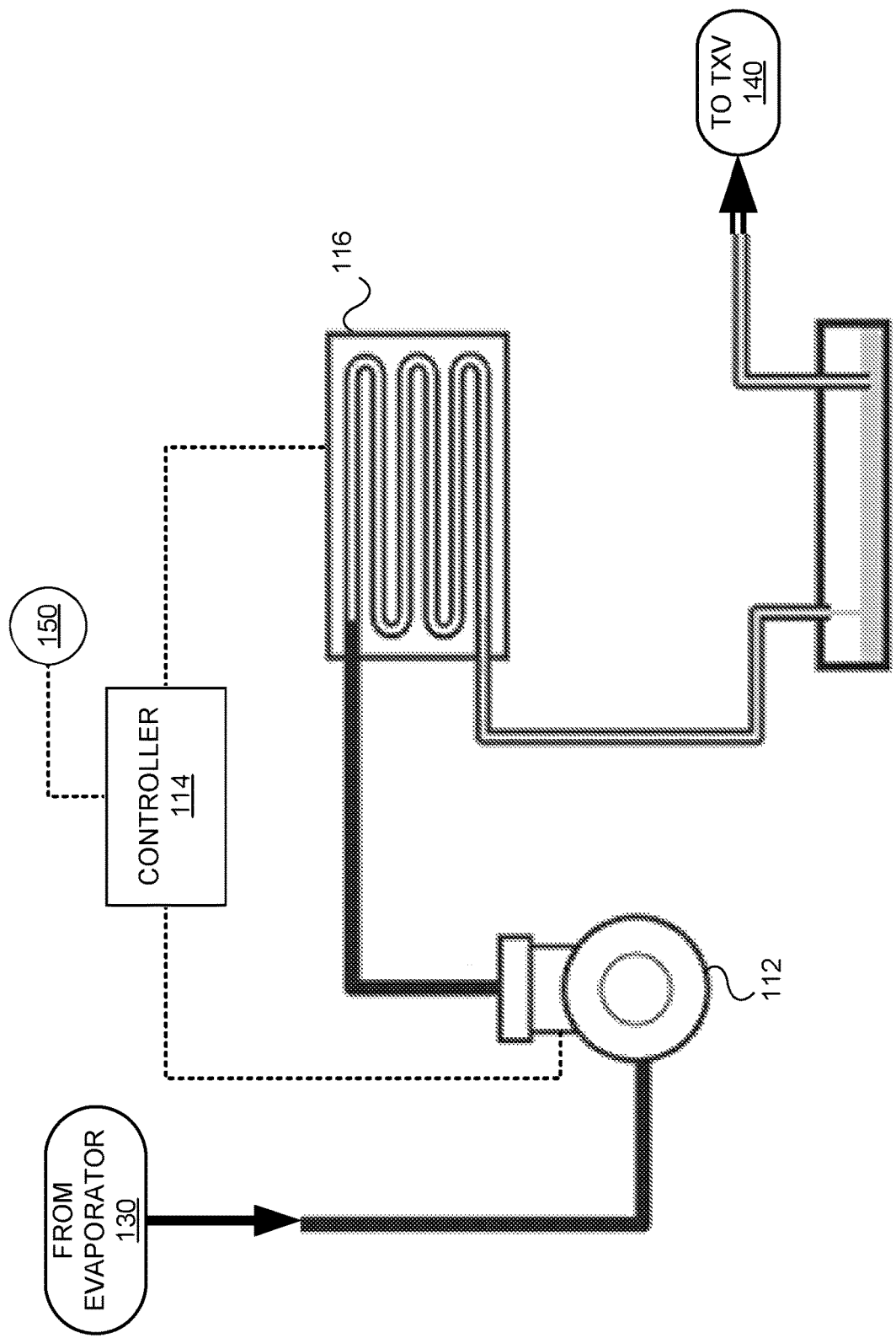
FIG. 2 illustrates a component diagram of an outdoor air conditioning system in accordance with the present disclosure.

FIG. 2 illustrates an example of an outdoor air conditioning unit 110, including a compressor 112 and a controller 114. The controller can be in communication with both the compressor 112 and the one or more sensors 150. The communication to the one or more sensors 150 can be wired and/or wireless. Alternatively, or additionally, the communication to the compressor 112 can be wired and/or wireless. The compressor 112 can also be in fluid and/or thermal communication with the fluid line 120 and the refrigerant. The compressor 112 can have an outlet temperature and/or an outlet pressure at which the refrigerant exits the compressor 112. The compressor 112 can be any type of compressor configured to be used in fluid and thermal communication with a refrigerant suction line.

The outdoor air conditioning unit 110 can include additional components in electrical and/or thermal communication with the compressor 112 and/or the controller 114. For example, the outdoor air conditioning unit 110 can include one or more valves, pumps, blowers, heat exchangers, and the like. The outdoor air conditioning 110 unit can also include a condenser 116 for condensing the vapor refrigerant into a liquid. Alternatively, the condenser 116 can be housed in a separate unit. The condenser 116 can be in fluid and/or thermal communication with the fluid line 120 and can receive refrigerant upon exiting the compressor 112. The condenser 116 can be in thermal communication with the ambient outdoor air in order to facilitate a heat exchange. The condenser 116 can also partition the liquid line (for liquid refrigerant having passed through the condenser 116) and the suction line (for vapor refrigerant having exited the evaporator 130 but not yet passing through the condenser 116). The condenser 116 can also communicate with the controller 114 and the one or more sensors 150. In some examples, the one or more sensors 150 can measure operating data from the condenser and provide the data to the controller 114 for processing.

The controller 114 can receive data from the one or more sensors 150. The one or more sensors 150 can include, for example, a fluid line temperature sensor, a fluid line pressure sensor, an outdoor air temperature sensor, and outdoor air humidity sensor, an indoor air temperature sensor, an indoor air humidity sensor, and the like. It should be understood that the one or more sensors 150 can be any sensor configured to measure a characteristic (e.g., temperature, humidity) of the fluid line, the indoor air, and/or the outdoor air. The controller 114 is shown in greater detail in FIG. 3.

Figure 3:
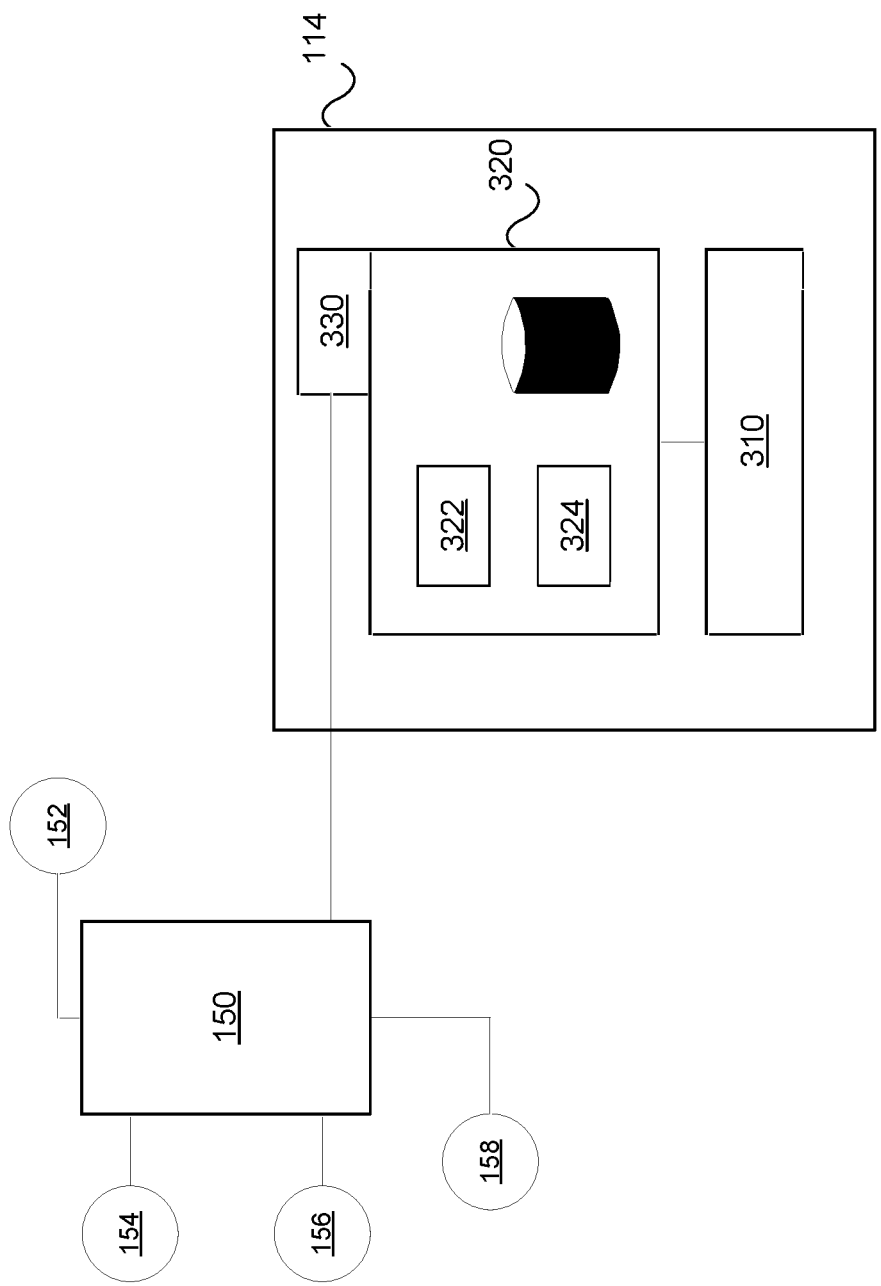
FIG. 3 illustrates a component diagram of a controller in accordance with the present disclosure.

As shown in FIG. 3, the controller 114 can comprise a variety of components for receiving and processing data, as well as components to output instructions. For instance, the controller 114 can comprise one or more processors 310 and memory 320, which can include a program 322, an operating system (OS) 324, and/or one or more storage devices 326. It should be understood that the controller 114 can receive data from one or more various sensors 150, process the data, and output one or more instructions to perform one, some, or all of the various functionalities described herein.

The controller 114 can also comprise an analog system. For instance, the controller 114 can be connected to a temperature sensing bulb (as one of the one or more sensors 150), such as the temperature sensing bulb in a thermal expansion valve. Other analog temperature and pressure sensors can be used in conjunction with analog systems to implement changes to the compressor 112 or to other components of the air conditioning system 100. For example, the controller can comprise one or more hydraulic lines, pistons, actuators, solenoids, and the like.

The controller 114 can also comprise a transceiver 330. The transceiver 330 can receive data from the one or more sensors 150. In such a manner, a pipeline of data can be constructed by receiving data from the sensors 150, processing the data at the controller 114, and outputting one or more corrective actions, if necessary. As shown, the one or more sensors 150 can comprise a temperature sensor 152, a pressure transducer 154, a flow meter 156, and/or a humidity sensor 158. Other sensors can be included in the one or more sensors 150, such as viscosity sensors, density sensors, concentration sensors, ambient temperature sensors, ambient pressure transducers, and any sensors known to measure a desirable property of the air conditioning system 100. Each of the sensors can collect data relating to characteristics of the air conditioning system 100 and relay the data from the one or more sensors 150 to the controller 114 via the transceiver 330.

The controller 114 can determine that a characteristic measured by the one or more sensors 150 is above a predetermined threshold. For example, the controller 114 can receive humidity data for an indoor humidity sensor and determine when the indoor humidity increases above a predetermined set point. The predetermined setpoint and/or threshold can be manually inputted by a user of the air conditioning system 100, or the predetermined setpoint and/or threshold can be calculated and determined by the controller 114 (or preprogrammed into the controller 114). For instance, the controller 114 can log and store historical data for a characteristic (e.g., suction pressure) of the air conditioning system 100 and calculate a baseline value for the characteristic based on the historical data. The controller 114 can then output instructions for one or more corrective actions.

Alternatively, or additionally, the controller 114 can be configured to maintain a historical record of the characteristics for a given air conditioning system 100, which can influence changes to suggested maintenance schedules, future design changes, and the like. A historical record of the characteristics of the air conditioning system 100 can also provide documentation for warranty disputes or other issues.

The corrective actions can include, for example, instructing the compressor 112 to increase a capacity of the compressor 112. The compressor 112 can achieve this by increasing a speed at which the compressor 112 operates. The capacity of the compressor 112 can be increased by the controller 114 by any method known to those of skill in the art. In such a manner, the temperature of the refrigerant exiting the compressor 112 will be lower than before the corrective action. Thus, the cooler refrigerant travelling through the refrigerant line 120 will improve the heat transfer at the evaporator 130. As would be appreciated, having a greater temperature difference between the refrigerant and the indoor air at the evaporator 130 will increase the heat transfer, thereby allowing more water to be condensed by the evaporator before sending the refrigerant back to the compressor 112.

By way of another example, the corrective actions can include instructing the condenser 116 to increase a blower speed to facilitate a greater heat transfer. A greater heat transfer at the condenser 116 can decrease the temperature of the refrigerant exiting the condenser 116. Thus, the cooler refrigerant travelling through the refrigerant line 120 will improve the heat transfer at the evaporator 130.

While the following methods are described with reference to the controller 114, it is understood that one or more method steps or whole methods can be performed by other systems, general-purpose computers, computer operators, and the like.

Figure 4:
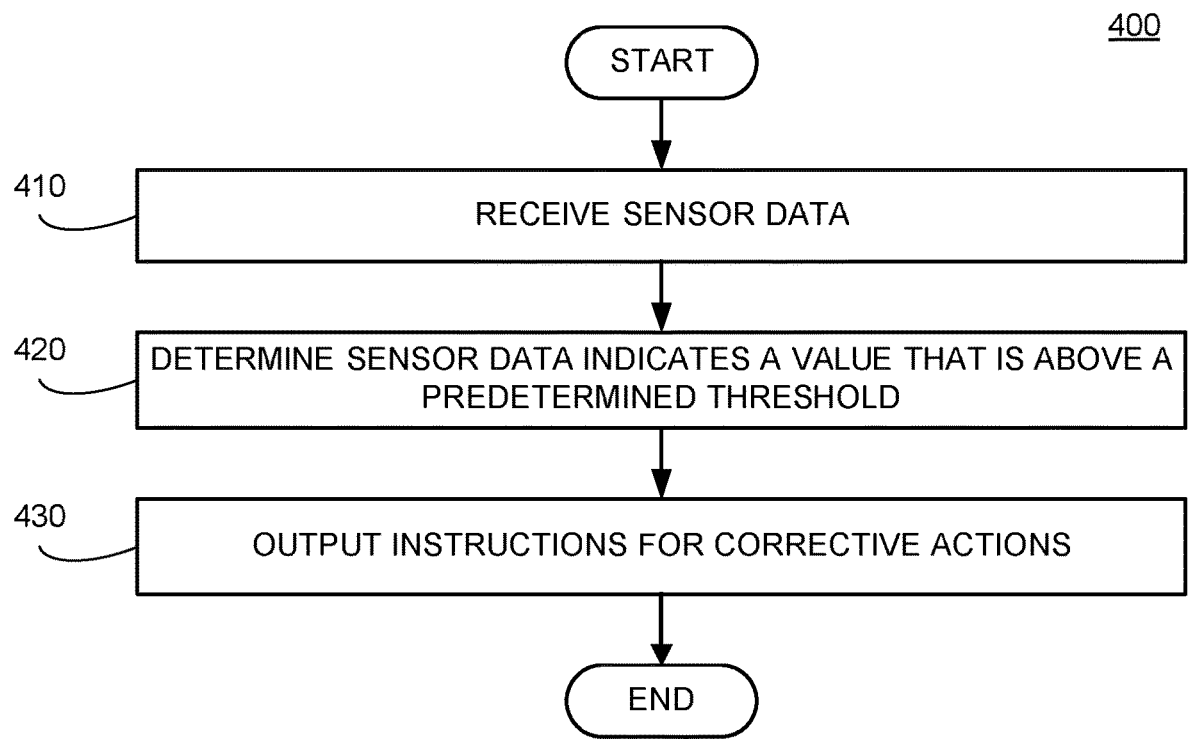
FIG. 4 illustrates a flowchart of a method for controlling the disclosed air conditioning systems in accordance with the present disclosure.

FIG. 4 illustrates a flowchart of a method 400 for controlling an air conditioning system 100. As shown, in block 410, the controller 114 can receive sensor data from the one or more sensors 150. The one or more sensors 150 can be measuring a characteristic of an indoor space in thermal communication with the air conditioning system, such as a temperature, pressure, and/or humidity of the indoor space. Alternatively, or additionally, the one or more sensors 150 can be measuring a characteristic of a refrigerant flowing through the air conditioning system 100, such as a suction pressure or suction temperature. The one or more sensors 150 can provide a value of the characteristic to the controller 114. The controller 114 can be constantly logging data from the one or more sensors 150 in a database to create historical data, which can be used for a variety of purposes. The method 400 can then proceed on to block 420.

In block 420, the controller 114 can determine that the value from the one or more sensors 150 is above a predetermined threshold. The predetermined threshold can be calculated from historical data and/or manually input by a user. For example, the controller 114 can use historical data to calculate that the average humidity in the indoor space typically goes no higher than 50%. If the one or more sensors 150 indicates that the humidity value has risen to 60%, then the controller 114 can determine that the predetermined threshold has been crossed. Alternatively, a user can designate to the controller 114 that the humidity should not exceed 40%. Then, anytime the one or more sensors 150 measure a humidity above 40%, the controller 114 can determine that the predetermined threshold has been crossed. The method 400 can then proceed on to block 430.

In block 430, the controller 114 can instruct the air conditioning system 100 to perform one or more corrective actions. For example, the controller 114 can instruct the compressor 112 to increase its capacity, thereby decreasing the temperature of the refrigerant exiting the compressor. Thus, the cooler refrigerant travelling through the refrigerant line 120 will improve the heat transfer at the evaporator 130. As would be appreciated, having a greater temperature difference between the refrigerant and the indoor air at the evaporator 130 will increase the heat transfer, thereby allowing more water to be condensed by the evaporator before sending the refrigerant back to the compressor 112. In such a manner, the controller 114 can effectively reduce the humidity of the indoor space by instructing the compressor 112 to increase its capacity. In some examples, increasing the capacity of the compressor 112 can include increasing a speed at which the compressor operates.

By way of another example, the controller 114 can instruct a thermal expansion valve 140 (or other such refrigerant metering device) to increase or decrease a degree of openness. In such a manner, the controller 114 can control the suction pressure of the refrigerant cycling through the air conditioning system 100. Alternatively, or additionally, the controller 114 can instruct one or more blowers interacting with the evaporator 130 to increase the heat transfer occurring at the evaporator 130. It should be understood that the controller 114 can be configured to control any desired parameters of the air conditioning system 100, including, but not limited to, evaporator coil temperature, suction temperature, suction pressure, liquid temperature, liquid pressure, sub-cooling, superheat, and the like.

It should be understood that other corrective actions can be instructed. For example, the controller 114 can instruct various blowers, pumps, and/or valves to adjust performance to reduce the temperature of the refrigerant and/or increase the heat exchange at the evaporator 130. The controller 114 can also utilize the historical data to maintain a historical record of the characteristics for a given air conditioning system 100, which can influence changes to suggested maintenance schedules, future design changes, and the like. A historical record of the characteristics of the air conditioning system 100 can also provide documentation for warranty disputes or other issues.

Certain examples and implementations of the disclosed technology are described above with reference to block and flow diagrams of systems and methods according to example examples or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some examples or implementations of the disclosed technology.

As used in this application, the terms "module," "server," "processor," "memory," and the like are intended to include one or more computer-related units, such as but not limited to hardware, firmware, a combination of hardware and software, software, or software in execution. For example, a module may be, but is not limited to being, a process running on a processor, an object, an executable, a thread of execution, a program, and/or a computer. By way of illustration, both an application running on a computing device and the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one component interacting with another module in a local system, distributed system, and/or across a network such as the Internet with other systems by way of the signal.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology. That is, the disclosed technology includes the performance of some or all steps of the methods and processes described herein in conjunction with the performance of additional steps not expressly discussed herein. Further, the present disclosure contemplates methods and processes in which some, but not all, steps described herein are performed.

While the present disclosure has been described in connection with a plurality of example aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

EXAMPLE USE CASES

The following examples describe examples of a typical user flow pattern. They are intended solely for explanatory purposes and not limitation.

A customer can desire for their indoor space to be maintained at 74° F. and no greater than 50% relative humidity. A thermostat to measure temperature and a humidity sensor can be placed in the customer's indoor space. The air conditioning system supplying cool air to the customer's home can include an indoor evaporator and a blower. The evaporator can have a coil where cold refrigerant interacts with air from the blower to supply cold air to the indoor space. The air conditioning system can also have an outdoor unit with a refrigerant line connecting the outdoor unit to the indoor evaporator. The outdoor unit can include a compressor to cycle refrigerant through the refrigerant line and a condenser to cool down spent refrigerant by conducting a heat exchange between the refrigerant and the outdoor air.

On a hot and humid day, the indoor humidity sensor can detect that the relative humidity in the customer's home has risen above 50%. The indication of the high humidity value can be sent wirelessly to a controller that itself can also be wireless from the air conditioning system. The controller, upon determining that the humidity is too high, can implement one or more corrective actions to the air conditioning system. In this example, the controller can (wirelessly or wiredly) communicate with the compressor. The controller can then instruct the compressor to increase its capacity thereby reducing the temperature of the refrigerant exiting the compressor. In such a manner, the colder refrigerant will remain at a decrease temperature when cycling back to the indoor evaporator. As will be appreciated, the colder refrigerant in the evaporator can increase the heat transfer efficiency and provide the additional latent heat needed to condense and remove the extra moisture from the indoor air.

What is claimed is:

1. An outdoor unit for use with an indoor unit of an unmatched split air conditioning system, the outdoor unit comprising:
   a refrigerant line;
   a first sensor; and
   a controller configured to:
      determine, using the first sensor, a first characteristic of refrigerant in the refrigerant line, wherein the first characteristic is a suction temperature of the refrigerant or a suction pressure of the refrigerant;
      determine, based at least in part on first historical data associated with the first characteristic of refrigerant in the refrigerant line, a first threshold associated with a humidity set point of a volume of indoor air;
      determine that the first characteristic is greater than or equal to the first threshold associated with the humidity set point of the volume of indoor air; and
      cause at least one of: a compressor, a thermal expansion valve, or a condenser in communication with the outdoor unit to control superheat of the refrigerant.

2. The outdoor unit of claim 1, further comprising:
   a second sensor;
   wherein the controller is further configured to:
      determine a humidity of the indoor air using the second sensor;
      determine, based at least in part on second historical data associated with the humidity of the indoor air, a second threshold;
      determine that the humidity is greater than or equal to the second threshold; and
      cause a blower of the indoor unit to increase an amount of ambient air flowing through an evaporator such that the heat exchange between the refrigerant and the indoor air is increased.

3. The outdoor unit of claim 1, wherein the controller is configured to cause at least one of: the compressor, the thermal expansion valve, or the condenser in communication with the outdoor unit to control superheat of the refrigerant by:
   causing the compressor to increase a speed of operation.

4. The outdoor unit of claim 1, wherein the controller is further configured to:
   cause at least one of: the compressor, the thermal expansion valve, or the condenser to control one or more of a suction temperature, a suction pressure, a liquid temperature, a liquid pressure, or sub-cooling.

5. The outdoor unit of claim 1, wherein the controller is further configured to:
   cause at least one of: the compressor, the thermal expansion valve, or the condenser to increase a sensible heat of the refrigerant.

6. The outdoor unit of claim 1, further comprising:
   the compressor, wherein the compressor is configured to move the refrigerant through the refrigerant line, and wherein the refrigerant has a first temperature at an outlet of the compressor; and
   wherein causing a temperature of the refrigerant at the outlet of the compressor to increase from the first temperature to a second temperature causes an evaporator in communication with the indoor unit to condense water present in the indoor air.

7. The outdoor unit of claim 6, wherein the change from the first temperature to the second temperature causes an increase in latent heat of the evaporator during a heat exchange between the refrigerant and the indoor air.

8. The outdoor unit of claim 1, wherein the indoor unit comprises a blower and an evaporator in thermal communication with a volume of indoor air to be conditioned.

9. The outdoor unit of claim 8, wherein the refrigerant line is configured to be fluidly coupled to the evaporator of the indoor unit, the evaporator comprising a coil via which the refrigerant in the refrigerant line thermally communicates with the volume of indoor air to exchange heat therewith.

10. A method for controlling an outdoor unit for use with an existing indoor unit of an unmatched air conditioning system, the method comprising:
   determining, by a controller of the outdoor unit and using a first sensor, a first characteristic of refrigerant in a refrigerant line, wherein the first characteristic is a suction temperature of the refrigerant or a suction pressure of the refrigerant;
   determining that the first characteristic is greater than or equal to a first threshold associated with a humidity set point of a volume of indoor air; and
   causing at least one of: a compressor, a thermal expansion valve, or a condenser in communication with the outdoor unit to control superheat of the refrigerant.

11. The method of claim 10, further comprising:
   determining a humidity of the indoor air using a second sensor;
   determining, based at least in part on first historical data associated with the first characteristic of refrigerant in the refrigerant line, a second threshold associated with a humidity set point of a volume of indoor air;
   determining, based at least in part on second historical data associated with the humidity of the indoor air, a third threshold;
   determining that the humidity is greater than or equal to the third threshold; and
   causing a blower of the indoor unit to increase an amount of ambient air flowing through an evaporator such that the heat exchange between the refrigerant and the indoor air is increased.

12. The method of claim 10, wherein causing at least one of: the compressor, the thermal expansion valve, or the condenser in communication with the outdoor unit to control superheat of the refrigerant by:
   causing the compressor to increase a speed of operation.

13. The method of claim 10, further comprising:
   causing at least one of: the compressor, the thermal expansion valve, or the condenser to control one or more of a suction temperature, a suction pressure, a liquid temperature, a liquid pressure, or sub-cooling.

14. The method of claim 10, further comprising:
   causing at least one of: the compressor, the thermal expansion valve, or the condenser to increase a sensible heat of the refrigerant.

15. The method of claim 10, wherein the compressor is configured to move the refrigerant through the refrigerant line, and wherein the refrigerant has a first temperature at an outlet of the compressor; and
   wherein causing a temperature of the refrigerant at the outlet of the compressor to increase from the first temperature to a second temperature causes an evaporator in communication with the indoor unit to condense water present in the indoor air.

16. The method of claim 15, wherein the change from the first temperature to the second temperature causes an increase in latent heat of the evaporator during a heat exchange between the refrigerant and the indoor air.

17. The method of claim 10, wherein the indoor unit comprises a blower and an evaporator in thermal communication with a volume of indoor air to be conditioned.

18. The method of claim 17, wherein the refrigerant line is configured to be fluidly coupled to the evaporator of the indoor unit, the evaporator comprising a coil via which the refrigerant in the refrigerant line thermally communicates with the volume of indoor air to exchange heat therewith.

* * * * *